(12) United States Patent
Feng

(10) Patent No.: US 11,286,364 B2
(45) Date of Patent: Mar. 29, 2022

(54) METHOD FOR PREPARING POLYMER MOULD-FREE STEREOSTRUCTURE FOAMED PRODUCT FROM SUPERCRITICAL FLUID

(71) Applicant: Guangdong Speed New Material Technology Co., Ltd, Guangdong (CN)

(72) Inventor: Yunping Feng, Guangdong (CN)

( * ) Notice: Subject to any disclaimer, the term of this patent is extended or adjusted under 35 U.S.C. 154(b) by 294 days.

(21) Appl. No.: 16/609,739

(22) PCT Filed: Oct. 23, 2018

(86) PCT No.: PCT/CN2018/111452
§ 371 (c)(1),
(2) Date: Oct. 31, 2019

(87) PCT Pub. No.: WO2020/047958
PCT Pub. Date: Mar. 12, 2020

(65) Prior Publication Data
US 2021/0332210 A1    Oct. 28, 2021

(30) Foreign Application Priority Data

Sep. 6, 2018    (CN) .......................... 201811035299.9

(51) Int. Cl.
*C08J 9/12* (2006.01)
*B29C 44/60* (2006.01)
(Continued)

(52) U.S. Cl.
CPC .............. *C08J 9/122* (2013.01); *B29B 11/12* (2013.01); *B29C 44/022* (2013.01);
(Continued)

(58) Field of Classification Search
CPC .... C08J 9/122; C08J 2323/08; C08J 2203/08; C08J 2203/06; C08J 2375/08;
(Continued)

(56) References Cited

U.S. PATENT DOCUMENTS 5,670,102 A * 9/1997 Perman ...................... C08J 9/18
264/50
10,227,467 B2 * 3/2019 Baghdadi ................... C08J 9/12

FOREIGN PATENT DOCUMENTS

CN    102504323 A * 6/2012

OTHER PUBLICATIONS

Definition of Stereoscopic. Dictionary.com (Year: 2021).*

* cited by examiner

*Primary Examiner* — Kara B Boyle
(74) *Attorney, Agent, or Firm* — Prakash Nama; Global IP Services, PLLC

(57) ABSTRACT

A method for preparing a polymer mould-free stereostructure foamed product from supercritical fluid, containing a supercritical fluid delivery system, a stereoscopic foaming system and a preheating system, and has the following steps: performing pressure molding on a polymer material to obtain a foaming preform, then preheating the foaming preform in the preheating system, delivering the foaming preform to the stereoscopic foaming system after a temperature rises to a preheating temperature, introducing the supercritical fluid, and decompressing after the supercritical fluid is swelled and diffused to the polymer. The polymer is swelled using high-temperature medium-pressure supercritical fluid by utilizing a one-step method in a stereoscopic foaming tank and then subjected to free mould-free stereoscopic pressure-relief form molding, so as to obtain a polymer microcellular foamed product with controllable product shape, size precision, pore fineness and product density.

8 Claims, 3 Drawing Sheets

(51) Int. Cl.
   *B29B 11/12* (2006.01)
   *B29C 44/02* (2006.01)
   *B29C 44/34* (2006.01)

(52) U.S. Cl.
   CPC ........ *B29C 44/348* (2013.01); *B29C 44/3453* (2013.01); *B29C 44/60* (2013.01); *C08J 2203/06* (2013.01); *C08J 2203/08* (2013.01); *C08J 2323/08* (2013.01); *C08J 2367/04* (2013.01); *C08J 2375/08* (2013.01)

(58) Field of Classification Search
   CPC ...... C08J 2367/04; B29B 11/12; B29C 44/60; B29C 44/3453; B29C 44/348; B29C 44/022
   See application file for complete search history.

METHOD FOR PREPARING POLYMER MOULD-FREE STEREOSTRUCTURE FOAMED PRODUCT FROM SUPERCRITICAL FLUID

BACKGROUND OF THE INVENTION

The disclosure pertains to the technical field of high polymer foaming, and particularly to a method for preparing a polymer mould-free stereostructure foamed product by using supercritical fluid as a physical foaming agent. The method can be used for supercritical fluid foamed stereostructure products such as thermoplastics, thermoplastic elastomers or rubber materials.

Methods for foam molding of polymers by utilizing supercritical fluid as a physical foaming agent mainly include a continuous extrusion foaming method, an injection foaming method and a batch autoclave foaming method. The continuous extrusion formation method is applicable to continuously extrusion of a foamed material having a certain sectional shape, is high in product foaming rate, but is single in shape; the injection foam molding method can inject foamed products having complicated shapes, but is small in product foaming rate, and both of two methods are high in production efficiency. The batch autoclave foaming method is used for bead foaming of polymers in most cases, the foaming beads are subjected to mould pressing utilizing foaming bead formation equipment to form foamed products having various shapes, however, this method is low in production efficiency, long in production period and large in equipment investment.

Chinese Patent CN102167840A discloses a method for preparing a polymer microcellular foamed material through supercritical mould pressing foaming. The method comprises the following steps: heating up a foaming mould on a mould pressing machine, then putting a polymer into the mould after a foaming temperature is reached, closing the mould pressing machine, sealing the mould, introducing the supercritical fluid into the mould, allowing the supercritical fluid to swell and diffuse the polymer, and then opening the mould pressing machine for pressure-relief foaming, so as to obtain a polymer microcellular foamed material.

Chinese Patent CN104097288A discloses a supercritical fluid assisted polymer mould pressing foaming device. The device comprises a supercritical fluid delivery system, a mould system, a temperature measurement device, a pressure measurement device, a pressure release device and a display and control system, wherein the supercritical fluid delivery system is connected with the mould system, and the temperature measurement device, the pressure measurement device and the pressure release device are respectively connected with the mould system. The mould system utilizes upper and lower heat plates on the mould pressing machine for heating. Supercritical fluid is gradually diffused to enter a polymer matrix for a certain period of time under the actions of a certain temperature and supercritical fluid pressure by utilizing super-strong permeation and diffusion capability of the supercritical fluid, and then the pressure in the mould is quickly released to obtain a foamed material having a certain shape. The device can be used for either free forming or controllable forming.

The above-mentioned molding methods for preparing the polymer mould pressing formed product by utilizing supercritical fluid as the physical foaming agent can only produce some regular formed planks, sheets and simple-shape products, and difficultly implement industrial large-scale production of some formed products having complicated shapes.

Chinese Patent CN107073767A relates to a method for manufacturing a three-dimensional formed product, and discloses a method for manufacturing a three-dimensional formed product having an inhomogeneous shape. This method adopts a two-stage nitrogen autoclave method and a preform having an inhomogeneous cross section in at least one size. This patent uses a two-step method in which the first step is that the preform is impregnated at high pressure in a high-pressure tank, and the second step is that the preform is expanded in a low-pressure tank after being cooled. The process flow is as follows: an injection molding preform undergoes gamma rays to cross-link materials. The cross-linked injection molding part is placed on a tray in the autoclave and impregnated at high pressure via nitrogen at 400 bars and 165° C. until the polymer is completely saturated by a gas. The pressure is then lowered to 170 bars to nucleate a pore structure, and then the autoclave is cooled to ambient temperature. Once the autoclave is at ambient temperature, the remaining pressure is released and the gas-containing injection molding part is removed from the autoclave. The second step is that the expanded injection molding part is placed in a −40° C. refrigerator for overnight to minimize loss of any gases before expansion. On the next day, the injection molding part is restored to room temperature, and then placed on the tray in the lower-pressure autoclave. Then, the pre-formed injection molding part is heated to a uniform temperature of 167 t under the nitrogen pressure of 14 bars, and then the pressure is released to atmosphere so that the molding part expands to form a three-dimensional formed product. Its molding method has the defects that the process is complicated, the foaming material is cross-linked by radiation, the material cannot be recycled and environmental protection is not achieved; the used molding pressure is high and pressure equipment requirement is high; the impregnation temperature is near a softening point and is low, time required for dissolution and diffusion balance of gas impregnated preforms is long, the two-step production method is adopted, and thus production cycle is too long, the production efficiency is low, and the formed product processing cost is high.

BRIEF SUMMARY OF THE INVENTION

Aiming at the above existing problems, the disclosure provides a method for preparing a polymer mould-free stereostructure foamed product from supercritical fluid to overcome the above problems existing in the prior art that production of formed products having complicated and varied shapes cannot be met. The method adopts a one-step formation method, the polymer formed preforms do not need a pre-crosslinking manner, and is directly impregnated and formed in the foaming tank without a formation mould. During the work, the stereoscopic foaming tank is always maintained to be in situations that the target temperature is 1.0-50° C. below the melting temperature or the melting point of the polymer, the pressure is less than 15 MPa, and impregnation and forming time only needs 30-120 min, production period is extremely short, the produced product is of a stereoscopic foaming structure, controllable in shape and precise in size. The method can be used for supercritical fluid foamed stereostructure products such as thermoplastics, thermoplastic elastomers or rubber materials.

In order to achieve the above objective, the disclosure adopts the following technical solution:

Provided is a method for preparing a polymer mould-free stereostructure foamed product from supercritical fluid, comprising a supercritical fluid delivery system, a stereoscopic foaming system and a preheating system, wherein the supercritical fluid delivery system is a supercritical CO2 or supercritical N2 delivery system, or a N2/CO2 mixed gas; the stereoscopic foaming system comprises a stereoscopic foaming tank, a temperature control device, a pressure control device and a pressure release device, and the stereoscopic foaming system is connected with the stereoscopic foaming system; the preheating system comprises a preheating tank, a heating cycle device and a temperature control device;

swelling and impregnating the polymer through high-temperature medium-pressure supercritical fluid by adopting a one-step molding method and then directly performing free mould-free stereoscopic pressure-relief form molding specifically comprises the following steps: performing pressure molding on a polymer material to obtain a foaming preform, then preheating the foaming preform in the preheating system, delivering the foaming preform to the stereoscopic foaming system after a temperature rises to a preheating temperature, closing and sealing the stereoscopic foaming tank, opening an intake valve, introducing the supercritical fluid to be regulated to be at a target temperature and pressure, swelling and diffusing the supercritical fluid toward the polymer for 30-120 min, and opening a pressure release device for pressure relief and forming, so as to obtain a polymer microcellular foamed product with controllable product shape, size precision, pore fineness and product density.

Preferably, the polymer is selected from but not limited to any one or a combination of polyethylene, polylactic acid, polypropylene, polystyrene, polymethyl methacrylate, polycarbonate, an acrylonitrile-butadiene-styrene copolymer, polyethylene terephthalate, polyamide, polyimide, polyphenylene sulfide, polyether sulfone, polyether ether ketone, rubber, silicone rubber, EPDM, a vinyl acetate copolymer, thermoplastic polyurethane, a thermoplastic elastomer.

Preferably, the polymer selects an amorphous polymer, the target temperature is 1.0-50° C. below the melting temperature of the polymer, and the pressure is 5-15 MPa.

Preferably, the polymer selects a crystalline polymer, the target temperature is 1.0-50° C. below the melting temperature of the polymer, and the pressure is 5-15 MPa.

Preferably, the pressure relief rate of the pressure release device of the stereoscopic foaming tank is 1-1000 MPa/s.

Preferably, the supercritical CO2 delivery system comprises a CO2 liquid storage tank and a CO2 booster station, and the supercritical N2 delivery system comprises a N2 liquid storage tank and a N2 booster station.

Preferably, the supercritical CO2 delivery system is a N2/CO2 mixed gas in which the volume percentage of N2 is 50-99%.

Preferably, the volume expansion ratio of the polymer microcellular foamed product has is a volume expansion ratio of 2-60 folds, an average pore diameter of 0.1-100 μm and a pore density of $1.0 \times 10^6 - 1.0 \times 10^{15}$ pores/cm3.

First of all, general plastic processing and molding means is utilized to prepare a preform for foam molding of a polymer, the foaming preform meets various size precisions after forming, the to-be-processed forming preform is preheated in the preheated tank, the preheating temperature is in a region below a softening temperature or melting point of the polymer, the heated preform enters the stereoscopic foaming tank together with a material rack after the preheating temperature is reached, the stereoscopic foaming tank is closed and sealed. During the work, the stereoscopic foaming tank is always maintained to be in situations that the target temperature is 1.0-50° C. below the melting temperature or the melting point of the polymer. A intake valve is opened, supercritical fluid is introduced, the supercritical fluid is swell and diffused toward the polymer for 30-120 min, the pressure release device is opened for exhausting, pressure relief and forming to obtain a polymer microcellular foamed product having controllable product shape, size precision, pore fineness and product density. After the gas in the stereoscopic foaming tank is discharged completely, the stereoscopic foaming tank sealing cover is quickly opened, the product is removed from the stereoscopic foaming tank and then the next production period is performed.

The discloses realizes microcellular forming by introducing supercritical fluid into the stereoscopic foaming tank. The temperature control system of the stereoscopic foaming tank can achieve control of the temperature inside the tank, and therefore the supercritical fluid state can be realized in the stereoscopic foaming tank, so that the polymer is in a high-temperature high-pressure supercritical fluid environment, and the balance of dissolution and diffusion of supercritical fluid to the polymer matrix is reached. Then, the nucleation, growth and forming formation of the pores in the polymer matrix can be induced by rapidly reducing the pressure. The microcellular foamed product having a stereoscopic foaming structure, controllable shape and precise size is obtained through precise control of a pressure, a temperature and a pressure release rate.

Due to adoption of the above technical solution, the disclosure has the beneficial effects:

1. a polymer is swelled using high-temperature medium-pressure supercritical fluid by utilizing a one-step method in the stereoscopic foaming tank and then subjected to free mould-free stereoscopic pressure-relief form molding to obtain the stereoscopic formed product;

2. the formed materials do not need to be cross-linked by radiation, and the materials can be recycled;

3. the used molding pressure is low, the temperature for impregnating impregnated preform with a gas is high, the impregnating temperature is near the melting temperature or the melting point, and the time required for balance of dissolution and diffusion of the gas impregnated preform is short, thereby greatly shortening the molding cycle;

4. the limitation that the existing technology can only prepare single-shape microcellular foamed products is broken, and the microcellular foamed product with a stereoscopic foaming structure, a controllable shape and a precise size can be prepared;

5. Because of large pressure relief rate and high pore nucleation rate when the stereoscopic foaming tank is opened, the formed microcellular foamed material has smaller pores, higher pore density and more excellent performance;

6. a set of stereoscopic foaming tank can be used for placing multi-layer to-be-formed products, and is suitable for industrial large-scale production.

BRIEF DESCRIPTION OF THE DRAWINGS

For better illustrating the technical solution of embodiments of the disclosure, drawings required for describing embodiments will be explained below. Apparently, the drawings in the description below are only some embodiments, and those skilled in the art can also obtain other drawings according to these drawings without any creative efforts.

Figure 1:
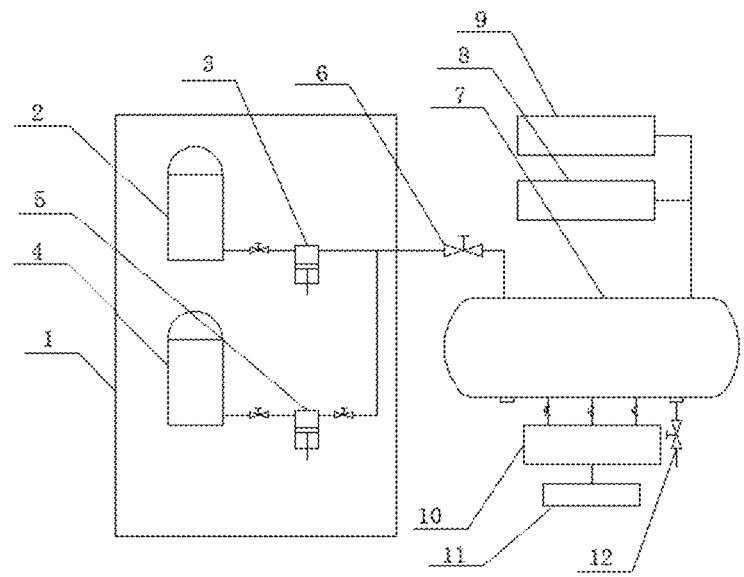
FIG. 1 is a structural flowchart of a supercritical fluid delivery system and a stereoscopic foaming system according to the disclosure.
Figure 2:
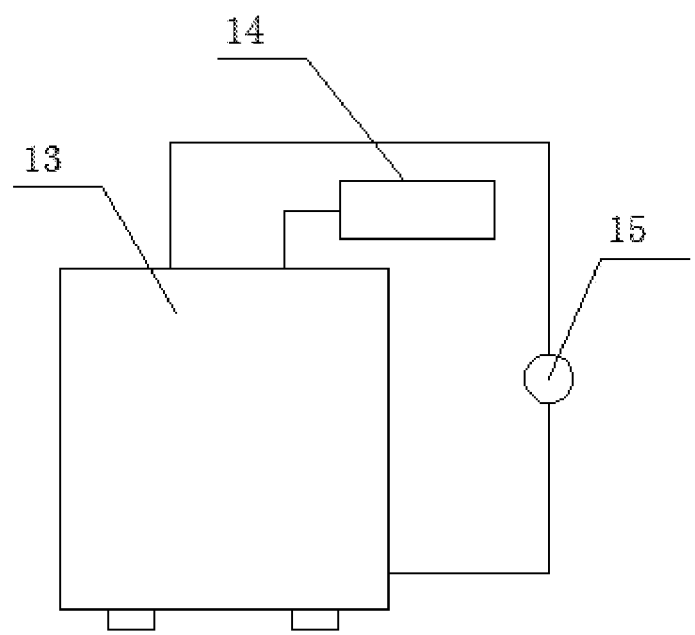
FIG. 2 is a diagram of a preheating system according to the disclosure.
Figure 3:
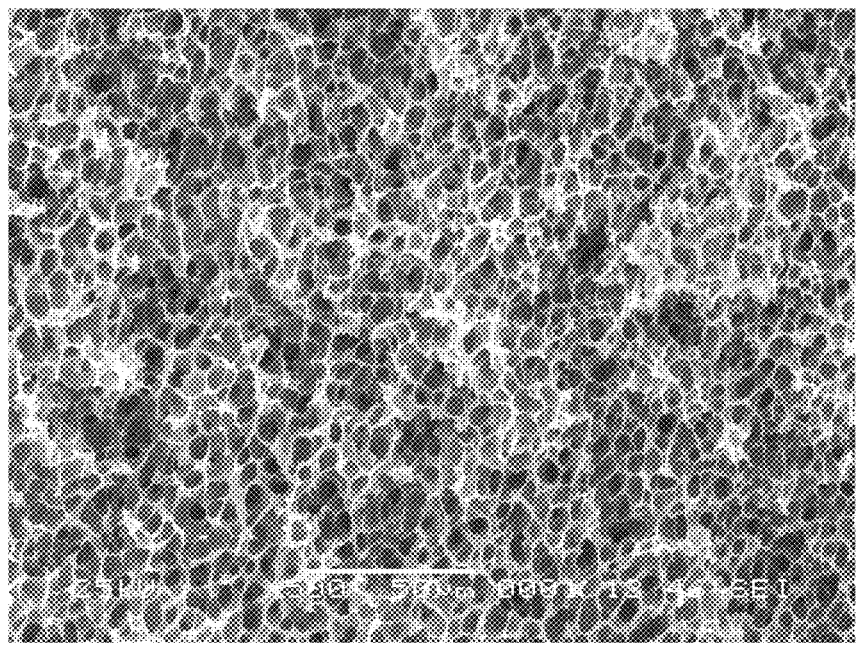
FIG. 3 is a scanning electron microscopy of a 1PLA formed product according to an embodiment.
Figure 4:
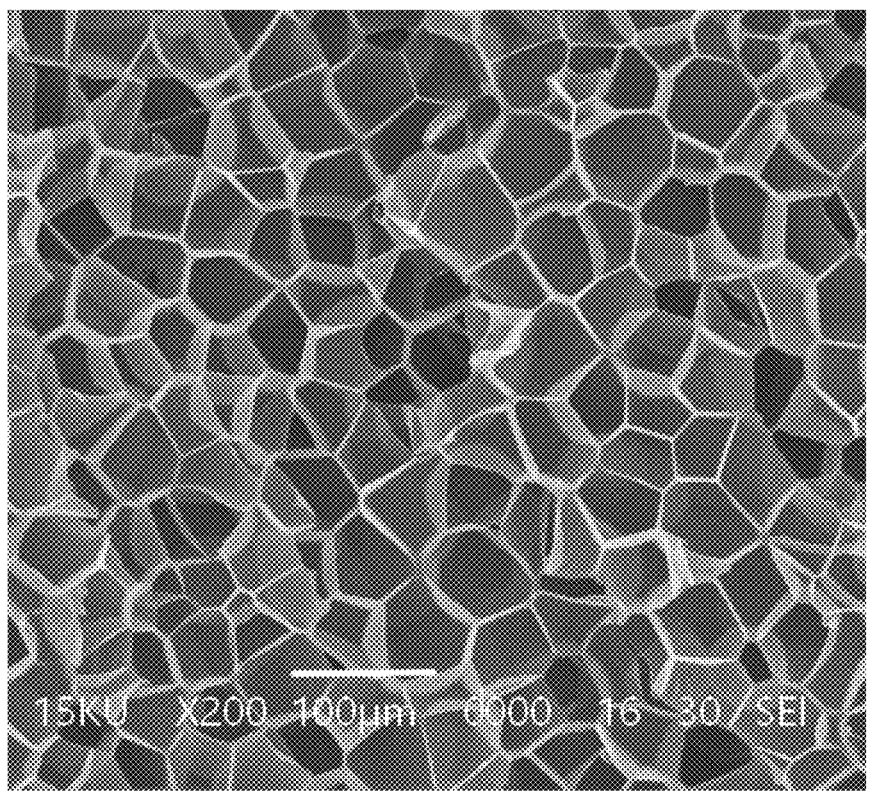
FIG. 4 is a scanning electron microscopy of a 2POPCO-HERE 8102 formed product according to an embodiment of the disclosure.
Figure 5:
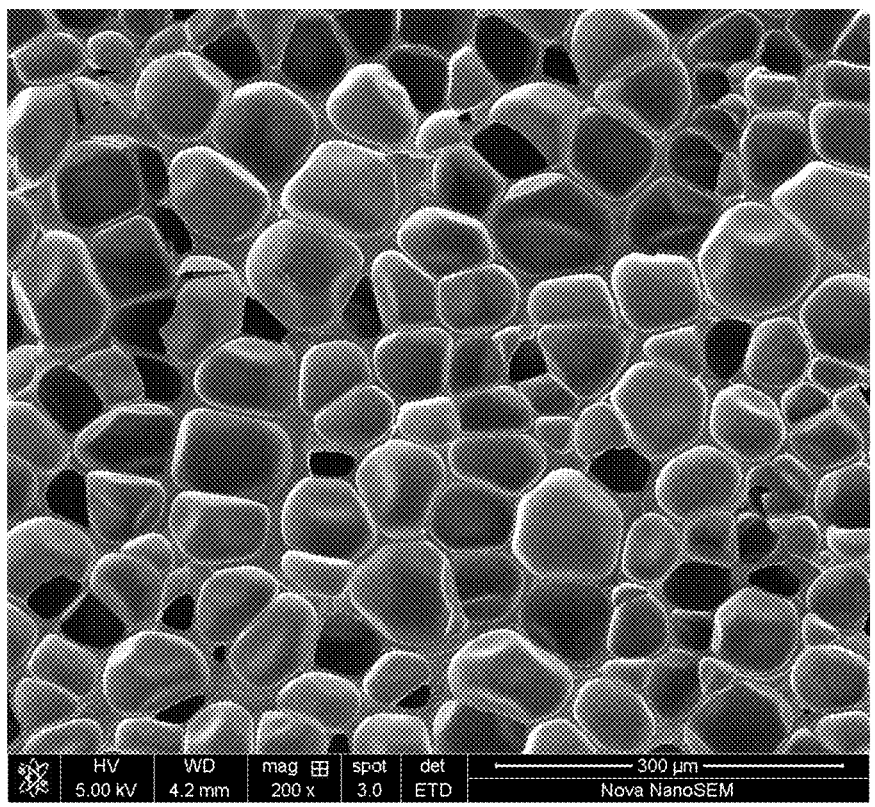
FIG. 5 is a scanning electron microscopy of a 3TPU 58315 formed product according to an embodiment of the disclosure.

In the drawings, 1—supercritical fluid delivery system; 2—N2 liquid storage tank; 3—N2 booster station; 4—CO2 liquid storage tank; 5—CO2 booster station; 6—intake valve; 7—stereoscopic foaming system; 8—pressure control device; 9—temperature control device; 10—pressure release device; 11—silencer, 12—vant valve; 13—preheating system; 14—temperature control device; 15—heating cycle device

DETAILED DESCRIPTION OF THE INVENTION

To make the purpose, the features and the benefits of the disclosure more clear, the technical solution in embodiments of the disclosure will be dearly and completely described below in conjunction with embodiments of the disclosure. Based on embodiments of the disclosure, other embodiments obtained by those of ordinary skill in the art without any creative efforts all belong to the scope of protection of the disclosure.

A method for preparing a polymer mould-free stereostructure foamed product from supercritical fluid comprises a supercritical fluid delivery system, a stereoscopic foaming system and a preheating system, wherein the supercritical fluid delivery system is a supercritical CO2 or supercritical N2 delivery system, or a N2/CO2 mixed gas; the stereoscopic foaming system comprises a stereoscopic foaming tank, a temperature control device, a pressure control device and a pressure release device, and the stereoscopic foaming system is connected with the stereoscopic foaming system; the preheating system comprises a preheating tank, a heating cycle device and a temperature control device;

specific operation steps are as follows: a polymer material is subjected to pressure molding to obtain a foaming preform, then the foaming preform is preheated in the preheating system, the foaming preform is delivered to the stereoscopic foaming system after a temperature rises to 30-50° C. below a softening temperature or a melting point of a polymer, the stereoscopic foaming tank is closed and sealed, an intake valve is opened, the supercritical fluid is introduced to be regulated to be at a target temperature and pressure, the supercritical fluid is swelled and diffused toward the polymer for 30-120 min, a pressure release device is opened for pressure relief and forming to obtain a polymer microcellular foamed product with controllable product shape, size precision, pore fineness and product density.

Embodiment 1

The polylactic acid particles having an average molecular weight of 100,000 and a melting point of 120° C. are subjected to injection molding via a mould of an injection molding machine to prepare a polylactic acid special-shaped preform. The to-be-processed polylactic acid special-shaped preform is preheated in the preheating tank, and the preheating temperature is in a region of 105° C. below the melting point of polylactic acid. After the preheating temperature is reached, the polylactic acid special-shaped perform enters the stereoscopic foaming tank together with the material rack, and the stereoscopic foaming tank sealing cover is closed. The stereoscopic foaming tank is always maintained at the target temperature of 125° C. during the work. The intake valve is opened, supercritical fluid is introduced, and the ratio of supercritical carbon dioxide to supercritical nitrogen is 30:70. At the target temperature, the supercritical fluid is swelled and diffused toward the polymer for 80 min when the working pressure of the stereoscopic foaming tank is 10 MPa. The pressure release device is opened for exhausting, pressure relief and forming, and the pressure-relief rate of the pressure release device of the stereoscopic foaming tank is 5 MPa/s, and therefore the polymer microcellular foamed product with controllable product shape, pore fineness and product density is obtained. The volume expansion ratio is 14 folds. Based on 100 parts of polymer weight, the content of supercritical fluid dissolved in the polymer is 15.0 parts after diffusion balance is reached. The average pore diameter is 6.3 μm by analyzing its interior pore morphology via scanning electron microscope, and the pore density obtained by calculation is $3.8 \times 10^9$ pores/cm3. The expansions of the polylactic acid special-shaped preform in all directions are basically uniform, and the linear expansion ratio is 2.33±0.15. A product having a form density of 90 kg/m3 is finally obtained

Embodiment 2

Polyolefin plastic POP COHERE 8102 having a density of 902 kg/m3 and a melting point of 98° C. is subjected to injection molding via a mould of an injection molding machine to prepare a to-be-formed polyolefin plastic special-shaped preform. The to-be-processed forming polylactic acid special-shaped preform is preheated in the preheating tank, and the preheating temperature is in a region of 80° C. below the melting point of polylactic acid. After the preheating temperature is reached, the to-be-processed forming polylactic acid special-shaped preform enters the stereoscopic foaming tank together with the material rack, and the stereoscopic foaming tank sealing cover is closed. The stereoscopic foaming tank is always maintained at the target temperature of 100° C. during the work. The intake valve is opened, supercritical fluid is introduced, and the ratio of supercritical carbon dioxide to supercritical nitrogen is 20:80. At the target temperature, the supercritical fluid is swelled and diffused toward the polymer for 100 min when the working pressure of the stereoscopic foaming tank is 12 MPa. The pressure release device is opened for exhausting, pressure relief and forming, and the pressure relief rate of the pressure release device of the stereoscopic foaming tank is 200 MPa/s, and therefore the polymer microcellular foamed product with controllable product shape, pore fineness and product density is obtained. The volume expansion ratio is 20 folds. Based on 100 parts of polymer weight, the content of supercritical fluid dissolved in the polymer is 18.0 parts after diffusion balance is reached. The average pore diameter is 32.5 μm by analyzing its interior pore morphology via scanning electron microscope, and the pore density obtained by calculation is $5.2 \times 10^8$ pores/cm3. The expansions of the polyolefin plastic special-shaped preform in all directions are basically uniform, and the linear expansion ratio is 2.62±0.15. A product having a form density of 45 kg/m3 is finally obtained.

Embodiment 3

TPU 58315 having a density of 1120 kg/m3 and a melting point of 135° C. is subjected to injection molding via a mould of an injection molding machine to prepare a to-be-formed TPU special-shaped preform. The to-be-processed TPU special-shaped preform is preheated in the preheating tank, and the preheating temperature is in a region of 120° C. below the melting point. After the preheating temperature is reached, the TPU special-shaped perform enters the stereoscopic foaming tank together with the material rack, and the stereoscopic foaming tank sealing cover is closed. The stereoscopic foaming tank is always maintained at the target temperature of 140° C. during the work. The intake valve is opened, supercritical fluid is introduced, and the ratio of supercritical carbon dioxide to supercritical nitrogen is 50:50. At the target temperature, the supercritical fluid is swelled and diffused toward the polymer for 90 min when the working pressure of the stereoscopic foaming tank is 13 MPa. The pressure release device is opened for exhausting, pressure relief and forming, and the pressure relief rate of the pressure release device of the stereoscopic foaming tank is 60 MPa/s, the pressure of the supercritical fluid in the tank is released to 2 MPa through the pressure release device of the stereoscopic foaming tank and then released to atmosphere, subsequently, the sealing cover is opened, and the polymer microcellular foamed product with controllable product shape, pore fineness and product density is obtained. The volume expansion ratio is 11 folds. Based on 100 parts of polymer weight, the content of supercritical fluid dissolved in the polymer is 12.0 parts after diffusion balance is reached. The average pore diameter is 72 µm by analyzing its interior pore morphology via scanning electron microscope, and the pore density obtained by calculation is $4.6 \times 10^7$ pores/cm3. The expansions of the TPU special-shaped preform in all directions is basically uniform, and the linear expansion ratio is 2.22±0.15. A product having a form density of 101 kg/m3 is finally obtained.

The above embodiments are only for illustrating the technical solution of the disclosure but not limiting thereto. Although the disclosure is described in detail by reference to the above-mentioned embodiments, those of ordinary skill in the art should understand that they can still make amendments to the technical solution in the above-mentioned embodiments, or make equivalent substitutions to partial technical features; these amendments or substitutions do not make the nature of the corresponding technical solution depart from the spirit and scope of the technical solutions of various embodiments of the disclosure.

In the description of this specification, referring to terms the description of 'one embodiment', "example", "specific example" and the like means specific features, structures, materials or characteristics described by combining this embodiment or example are included in at least one embodiment or example of the disclosure. In this specification, illustrative representation of the above terms does not necessarily refer to the same embodiment or example. Furthermore, the described specific features, structures, materials or characteristics can be combined in any one or more embodiments or examples in a proper manner.

The above disclosed preferred embodiments of the disclosure are only for helping to illuminate the disclosure. The preferred embodiments do not elaborate all the details, and do not limit concrete implementations of the disclosure. Apparently, many amendments and variations can be made according to contents of this specification. Selection and specific description of these embodiments by this specification are intended to better explain the principle and actual application of the disclosure, and therefore those skilled in the art can well understand and utilize the disclosure. The disclosure is limited only by claims and all the scopes and equivalents thereof.

What is claimed is:

1. A method for preparing a polymer mould-free formed product from supercritical fluid, comprising a supercritical fluid delivery system, a three-dimensional forming system and a preheating system, wherein the supercritical fluid delivery system is a $N_2/CO_2$ mixed gas in which the volume percentage of $N_2$ is 50-99%; the three-dimensional forming system comprises a three-dimensional forming tank, a temperature control device, a pressure control device and a pressure release device, and the supercritical fluid delivery system is connected with the three-dimensional forming system; the preheating system comprises a preheating tank, a heating cycle device and a temperature control device;

swelling and impregnating the polymer using supercritical fluid by utilizing a one-step method in the three-dimensional forming tank and then directly subjected to free mould-free three-dimensional pressure-relief form molding specifically comprises the following steps: performing pressure molding on a polymer material to obtain a foaming preform, then preheating the foaming preform in the preheating system, delivering the foaming preform to the three-dimensional forming system after a temperature rises to a preheating temperature, closing and sealing the three-dimensional forming tank, opening an intake valve, introducing the supercritical fluid to be regulated to be at a target temperature and pressure, swelling and diffusing the supercritical fluid toward the polymer for 30-120 min, and opening the pressure release device for pressure relief and forming, so as to obtain a polymer microcellular foamed product with controllable product shape, size precision, pore fineness and product density.

2. The method for preparing a polymer mould-free three-dimensional formed product from supercritical fluid according to claim 1, wherein the polymer is selected from any one or a combination of polyethylene, polylactic acid, polypropylene, polystyrene, polymethyl methacrylate, polycarbonate, an acrylonitrile-butadiene-styrene copolymer, polyethylene terephthalate, polyimide, polyimide, polyphenylene sulfide, polyether sulfone, polyether ether ketone, rubber, silicone rubber, EPDM, an ethylene-vinyl acetate copolymer, thermoplastic polyurethane and a thermoplastic elastomer.

3. The method for preparing a polymer mould-free three-dimensional formed product from supercritical fluid according to claim 2, wherein the polymer is an amorphous polymer, the target temperature is 1.0-50° C. below the melting temperature of the polymer, and the pressure is 5-15 MPa.

4. The method for preparing a polymer mould-free three-dimensional formed product from supercritical fluid according to claim 2, wherein the polymer is a crystalline polymer, the target temperature is 1.0-50° C. below the melting temperature of the polymer, and the pressure is 5-15 MPa.

5. The method for preparing a polymer mould-free three-dimensional formed product from supercritical fluid according to claim 3, wherein the pressure relief rate of the pressure release device of the three-dimensional forming tank is 1-1000 MPa/s.

6. The method for preparing a polymer mould-free three-dimensional formed product from supercritical fluid according to claim 4, wherein the pressure relief rate of the pressure release device of the three-dimensional forming tank is 1-1000 MPa/s.

7. The method for preparing a polymer mould-free three-dimensional formed product from supercritical fluid according to claim 3, wherein the volume expansion ratio of the polymer microcellular foamed product has a volume expansion ratio of MO folds, an average pore diameter of 0.1-100 μm and a pore density of $1.0 \times 10^6$-$1.0 \times 10^{15}$ pores/cm$^3$.

8. The method for preparing a polymer mould-free three-dimensional formed product from supercritical fluid according to claim 4, wherein the volume expansion ratio of the polymer microcellular foamed product has a volume expansion ratio of 2-60 folds, an average pore diameter of 0.1-100 μm and a pore density of $1.0 \times 10^6$-$1.0 \times 10^{15}$ pores/cm$^3$.

* * * * *